Aug. 16, 1966  E. E. MAIDEN ETAL  3,267,288
SYSTEM FOR FLOATING A BATTERY ON A LOAD LINE
Filed Oct. 20, 1964
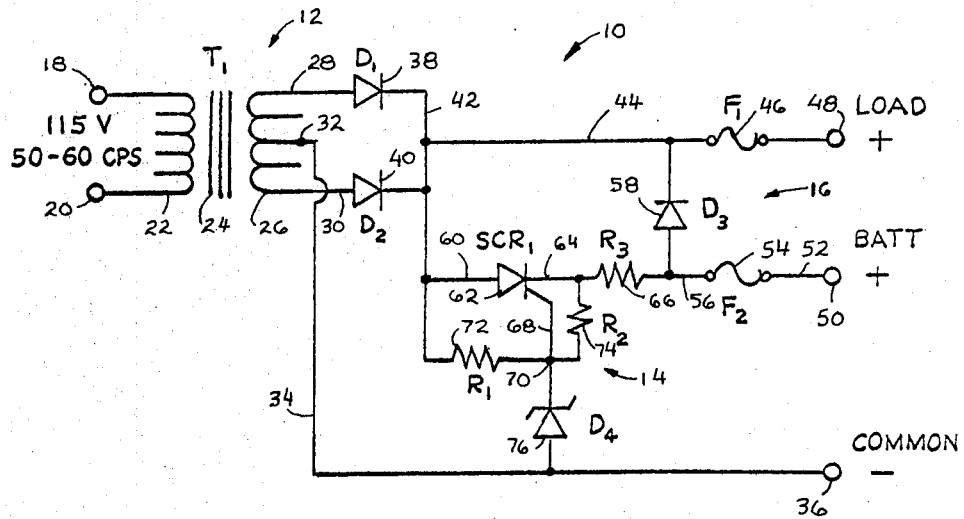
INVENTORS
ELMO E. MAIDEN,
CLINTON E. MAIDEN,
MINDAUGAS E. GEDGAUDAS
BY
EDWARD D. O'BRIAN
ATTORNEY //3,267,288
//SYSTEM FOR FLOATING A BATTERY ON A LOAD LINE
Elmo E. Maiden, Clinton E. Maiden, and Mindaugas E. Gedgaudas, Canoga Park, Calif., assignors to Newmark Products, Inc., Norwalk, Calif., a corporation of California
Filed Oct. 20, 1964, Ser. No. 405,053
4 Claims. (Cl. 307—66)

This invention is directed to a power supply particularly adapted to supply a direct current load and charging current to a battery while at the same time permitting, upon reduction cessation of power from the primary source, the use of the battery to supply part of or all of the load current.

There are a number of vehicles in the modern system of transportation that have their own battery to supply the load requirement of the vehicle, but at the same time these vehicles are often brought to a location where standard line current is available. Vehicles of this nature are usually in the form of travel trailers and boats. Each of these vehicles has considerable internal need for electric current for lighting and driving auxiliary motors, and each is often brought to a place where it can be plugged into a standard power supply. Such vehicles are widely used and there is considerable demand for a circuit which will permit alternative operation and combined operation where the battery can supply the load any time, should voltage requirement so suggest. Furthermore, where an external power supply is available and charge of the battery is required, the circuit should supply the charge and load current. This situation also occurs in other environments, for example, some trucks have battery powered instrumentation or equipment in their load space and when such trucks are parked in a storage lot or at a dock it becomes desirable to continue power supply to the load. In such circumstance the power supply of this invention is desirable for the battery normally used for supplying the load current is charged while being maintained in standby service. A circuit of such nature is also of value in any situation where standby batteries are provided for emergency service.

Accordingly, it is an object of this invention to provide a power supply unit which interconnects a battery and load together to a suitable source of conventional electric power supply and which maintains the battery in properly charged condition during connection to the external supply.

It is another object of this invention to provide an economic convenient and flexible power supply which supplies the proper current and voltage to a load at all times.

It is another object of this invention to provide an inexpensive, compact and readily serviced, reliable power supply.

Other objects and advantages of this invention will become apparent from a study of the following portion of this specification, the attached claims and the drawing in which:

The single figure is an electrical schematic of the power supply of this invention.

As an aid to understanding this invention it can be stated in essentially summary form that it is directed to a power supply comprising a battery connected to a load in such a manner that current may flow in one direction between the battery and the load. Additionally connected is an alternative rectified power supply which is connected in parallel to both the load and through a suitable battery charge control to the battery. The rectified source comes from a conventional alternatively connected line power supply so that the load is supplied both from the battery and from the line power supply depending on current requirements.

This invention will be understood in greater detail by reference to the following portion of the specification wherein the drawing is referred to and described. In the single figure of the drawing the power supply of this invention is generally indicated at 10. The power supply 10 comprises a conversion section 12 which converts a higher alternating current to the appropriate voltage of rectified direct current, battery charging control section 14 which regulates the flow of charging current to the battery, a battery flow control section 16.

The conversion section 12 is adapted to be supplied with alternating current, such as the conventional 115 volt, 50 to 60 cycle per second, household supply at line connections 18 and 20. Line connections 18 and 20 supply the primary 22 of transformer 24. Transformer 24 has a secondary 26 having end output lines 28 and 30 and center tap 32. The ratio of turns between the primary 22 and secondary 26 is appropriate to give the desired output voltage between lines 28 and 30 in accordance with the voltage available at line connections 18 and 20 as is described below.

Common line 34 is connected to the center tap 32 and to common line connection 36. It is understood that when installed in a vehicle, the power supply 10 has its common line connection 36 connected to the common circuitry within the vehicle.

Diode 38 is connected to output line 28 while diode 40 is connected to output line 30. Furthermore, both diodes 30 and 40 have their outputs connected to buss 42 which accordingly carries a D.C. pulsating voltage, common to full wave rectifiers which are not equipped with pulsation smoothing components. Buss 42 is connected to line 44 to fuse 46 which in turn is connected to the load connection 48. It is understood that the various electrical loads in the vehicle are connected between the load connection point 48 and the common line connection point 36. Thus, a plurality of conventional loads are connected in parallel thereacross so that the loads can be independently operated.

Battery connection 50 is provided for the connection of a suitable battery into the circuit. Such a battery is connected between the common line connection 36 and battery connection 50 so as to impress a suitable voltage thereon. Line 52 is connected to fuse 54, which in turn is connected to line 56. Line 56 is connected to battery current flow control diode 58 which is in turn connected to line 44. It can be seen that the battery impresses a voltage between line 34 and line 56 and the conversion section 12 impresses a voltage between line 34 and line 44. Whenever the battery voltage is higher than the conversion section voltage the battery supplies current to the load connection 48 through diode 58. However, whenever the voltage between line 44 and line 34 is greater than the voltage between line 56 and line 34 current cannot flow in the reverse direction through diode 58 in the direction for charging the battery. Thus, the battery acts in the position of a standby power supply which automatically supplies current for the load whenever the conversion section voltage drops off. This dropoff, of course, may be caused by disconnection of the line connections 18 and 20 from the alternating current source. However, whenever the conversion section 12 is supplying power, the battery acts in a standby capacity for when the load becomes so great that the voltage between lines 44 and 34 drops off. In such a case the battery is in a position and condition to supply part of the power requirement.

Battery charging is accomplished in the battery charging control section 14. Line 60 is connected to buss 42 and to silicon controlled rectifier 62. Silicon controlled rectifier 62 is connected through line 64 and thence through current limiting resistor 66 to line 56. Thus, when the silicon controlled rectifier 62 is conducting, current can flow from buss 42 through line 60, through rectifier 62, line 64, current limiting resistor 66, line 56, fuse 54, line 52 to battery connection 50 in a suitable direction for and for the purpose of charging the battery.

Control of silicon controlled rectifier 62 is accomplished by having its gate connected to line 68 which is in turn connected to junction 70. Also connected to junction 70 are bias resistors 72 and 74. Bias resistor 72 has its other end connected to buss 42, while bias resistor 74 has its other end connected to line 64 for suitable bias of the gate. Zener diode 76 is connected between common line 34 and junction 70. The forward voltage drop between line 68 through the gate and cathode of silicon controlled rectifier 62 to its output line 64 is relatively small compared to the breakdown voltage of zener diode 76. Thus, for practical purposes, the silicon controlled rectifier 62 will only be conducting when the voltage between line 34 and line 64 is less than the breakdown voltage of the zener diode 76. When the battery voltage across lines 34 and 64 is greater than the breakdown of the zener diode 76, the zener diode maintains a silicon controlled rectifier nonconductive, for the gate voltage of the silicon controlled rectifier is clamped at the breakdown voltage of the zener diode 76.

Particular values and identifications of suitable components are given below. It is assumed that in this exemplary list of components that 115 volt, alternating current at 50/60 c.p.s. is the intended external power supply to be connected and that the battery connected between connections 36 and 50 is a 12 volt battery. Furthermore, it is assumed that the maximum current flow to load through connection 48 is 30 amperes. For this group of requirements the below list of components are considered desirable.

| Refer. No. | Item | Identification |
|---|---|---|
| 24 | Transformer | 14 v. center tap to ends. |
| 38 | Diode | 1N 3659, 30 a. max. |
| 40 | do | 1N 3659, 30 a. max. |
| 46 | Fuse | 30 amp. |
| 54 | do | 30 amp. |
| 58 | Diode | 1N 3659, 30 a. max. |
| 62 | Silicon contr. rect | MCR 808-1. |
| 66 | Resistor | .1 ohm. |
| 72 | do | 100 ohm. |
| 64 | do | 200 ohm. |
| 66 | Zener diode | 1N 2979A, 14 v. breakdown. |

The operation of the power supply 10 can be best described with respect to its installation in a vehicle. Assuming now that the power supply is fully installed in a travel trailer, the electrical load of the travel trailer would be connected in parallel between connectors 36 and 48. Furthermore, the battery of the travel trailer, a 12 volt unit, would be connected between connectors 36 and 50. Assuming now that the trailer is parked, but it is without the benefit of an external power supply, when the load is turned on in the trailer, current flow from the battery goes through connector 50, line 52, fuse 54, line 56, diode 58, fuse 46, connector 48, through the load to the common connector 36 and thence from the common connector 36 back to the battery. This is a more or less conventional battery-load circuit, except for the fact that the diode 58 prevents reverse current.

When the trailer is connected to a power supply, such as 115 volt, 50/60 c.p.s. alternating current, as in this example, transformer 24 is energized to energize diodes 38 and 40. These diodes act as a full wave rectifier and apply approximately 14 volts R.M.S. D.C. between lines 34 and 44. Now the load connected between connectors 36 and 48 is supplied from this power supply. This is higher than the battery voltage and reverse current into the battery is prevented by diode 58. Thus, the load is supplied entirely by the diodes 38 and 40. However, should the load become heavy and the line resistance such that diodes 38 and 40 cannot supply adequate voltage, the voltage in line 44 may drop to a point where current from the battery flows through diode 58 to aid in supplying the load.

The battery charging control section 14 is arranged so that zener diode 76 maintains the silicon controlled rectifier 62 clamped until the battery voltage drops below the breakdown voltage of the zener diode 76 so that the silicon controlled rectifier 62 is rendered conductive. Then current is permitted to flow through line 60 in the battery charging direction. When battery voltage rises, indicating a full charge, it exceeds the breakdown of the zener diode 76 and the silicon controlled rectifier is shut off. Thus, while the battery is on standby to aid in heavy loads and the main current for load supply comes from the full wave rectifier, the additional function of the battery charging is accomplished.

This invention having been described in its preferred embodiment it is clear that it is susceptible to numerous modifications and changes without the exercise of the inventive faculty. Accordingly, the scope of this invention is defined by the scope of the following claims.

We claim:

1. An electric circuit adapted to be used with a battery and a source of conventional electric power to control electric current, said circuit comprising load connection means so that electrical loads can be connected in parallel to be supplied by said circuit, battery connection means so that a battery can be connected to said circuit to supply current to said load connection means, unidirectional electric current flow control means connected between said battery connection means and said load connection means so that current can flow in only one direction from said battery connection means to said load connection means, rectifier means, having an input connection and an output connection, said rectifier means being connected at its output connection to said load connection means and being arranged to be connected at its input connection to the source of conventional electric power, electric current flow control means, said electric current flow control means comprising a silicon controlled rectifier and biasing means connected to said silicon controlled rectifier to bias said silicon controlled rectifier toward its conductive condition, said electric current flow control means being connected to said output connection of said rectifier means and to said battery connection means, said electric current flow control means being connected so that it permits flow of electric current only when the voltage at said battery connection means is below a predetermined value.

2. The power supply of claim 1 wherein a zener diode is connected to said biasing means so that when the voltage at said battery connection means is below substantially the breakdown voltage of said zener diode said silicon controlled rectifier becomes conductive so that said rectifier means supplies charging current to said battery connection means.

3. An electric circuit adapted to be used with a battery and with a source of conventional electric power to control electric current, said circuit comprising load connection means whereat conventional electric loads are adapted to be connected, battery connection means whereat a conventional battery is adapted to be connected and power input connection means adapted to be connected to a conventional source of current, rectifier means having an input connection and an output connection, said rectifier means being connected at its input connection to be energized by energization of said power input connection means, said rectifier means being connected at its output connection to said load connection means, unidirectional electric flow control means connected between said battery connection means and said load connection means so that electric current from said rectifier means is prevented from flowing directly to said battery connection means, battery charging control means, said battery charging control means comprising a silicon controlled rectifier, biasing means connected to said silicon controlled rectifier, a zener diode connected to said silicon controlled rectifier, said biasing means and said zener diode being arranged to prevent conductivity of said silicon controlled rectifier when the voltage at said battery connection means exceeds substantially the breakdown voltage of said zener diode and to cause conductivity of said silicon controlled rectifier when the voltage at said battery connection means is below substantially the breakdown voltage of said zener diode, said battery charging control means being connected to said output connection of said rectifier means and to said battery connection means, said battery charging control means comprising means connected between said rectifier means and said battery connection means adapted to control current flow therebetween.

4. An electric circuit adapted to be used with a battery and a source of conventional electric power to control electric current, said circuit comprising:

rectifier means, said rectifier means having an input, said rectifier input being adapted to be connected to the source of conventional electric power, said rectifier means having first and second parallel output circuits;

said electric circuit having load connection means, said first rectifier output circuit being connected to said load connection means;

said electric circuit having battery connection means, said electric circuit also including battery charging current flow control means, said second parallel rectifier output circuit being connected through said battery charging current flow control means to said battery connection means;

unidirectional electric current flow control means continuously connected between said battery connection means and said load connection means so that current can flow in only one direction from said battery connection means to said load connection means;

said electric circuit being arranged so that when it is connected, said rectifier means supplies current to said load connection means dependent upon load current demand through said first parallel circuit and supplies current to said battery connection means through said second parallel circuit depending upon the state of voltage at said battery connection means by control by said battery charging current flow control means, and said unidirectional electric current flow control means prevents flow of electric current from said first parallel circuit to said battery connection means while current is being supplied by said rectifier, and said unidirectional electric current flow control means permits flow of current from said battery connection means through said unidirectional electric current flow control means to said load connection means when said rectifier means is inactive.

References Cited by the Examiner

UNITED STATES PATENTS

| | | | |
|---|---|---|---|
| 1,710,851 | 4/1930 | Yunker | 322—28 XR |
| 1,951,482 | 3/1934 | Holden | 307—64 |
| 2,062,274 | 11/1936 | Rees | 307—64 |
| 2,341,238 | 2/1944 | Peterson | 307—64 |
| 2,557,298 | 6/1951 | Leece | 320—57 XR |
| 2,561,804 | 7/1951 | Leece | 322—28 |
| 2,614,241 | 10/1952 | Diamanthides | 322—28 XR |
| 2,716,706 | 8/1955 | Palmer | 307—66 |
| 2,747,108 | 5/1956 | Pelavin | 307—66 |
| 2,986,654 | 5/1961 | Cunning | 307—88.5 |
| 3,002,105 | 9/1961 | Cady | 307—64 |
| 3,018,342 | 1/1962 | Palmer | 320—39 X |
| 3,049,623 | 8/1962 | Du Vall | 307—66 |
| 3,114,095 | 12/1963 | Palmer | 307—66 X |
| 3,160,805 | 12/1964 | Lawson | 320—39 |
| 3,189,788 | 6/1965 | Cady | 307—64 X |
| 3,193,750 | 7/1965 | Chait | 322—28 XR |

ORIS L. RADER, *Primary Examiner.*

LLOYD McCOLLUM, MILTON O. HIRSHFIELD,
*Examiners.*

T. J. MADDEN, *Assistant Examiner.*